(12) United States Patent  
Williams

(10) Patent No.: US 6,659,346 B1
(45) Date of Patent: Dec. 9, 2003

(54) SEMI-AUTOMATED SHOPPING SYSTEM

(76) Inventor: Terrence R. Williams, 1112-101 Chandler Dr, Rock Hill, SC (US) 29730

( * ) Notice: Subject to any disclaimer, the term of this patent is extended or adjusted under 35 U.S.C. 154(b) by 0 days.

(21) Appl. No.: 10/171,942

(22) Filed: Jun. 14, 2002

(51) Int. Cl.[7] ............................................. G06K 15/00
(52) U.S. Cl. .................. 235/383; 235/380; 235/472.02; 235/375; 705/1; 705/13; 705/16
(58) Field of Search ................................. 235/383, 380, 235/477.02, 375, 492; 705/1, 13, 16

(56) References Cited

U.S. PATENT DOCUMENTS

| | | | |
|---|---|---|---|
| 4,071,740 A | | 1/1978 | Gogulski |
| 4,929,819 A | * | 5/1990 | Collins, Jr. .................. 235/383 |
| D331,136 S | | 11/1992 | Davis et al. |
| 5,250,789 A | * | 10/1993 | Johnsen ........................ 705/14 |
| 5,361,871 A | | 11/1994 | Gupta et al. |
| 5,418,354 A | | 5/1995 | Halling et al. |
| 5,424,524 A | | 6/1995 | Ruppert et al. |
| 5,435,582 A | * | 7/1995 | Davidson ................ 280/33.992 |
| 5,471,561 A | * | 11/1995 | Cowgill et al. ............. 700/247 |
| 5,557,088 A | * | 9/1996 | Shimizu et al. ............. 235/383 |
| 5,816,725 A | * | 10/1998 | Sherman et al. ............ 400/692 |
| 5,821,512 A | | 10/1998 | O'Hagan et al. |
| 6,168,079 B1 | * | 1/2001 | Becker et al. ............... 235/383 |
| 6,321,135 B1 | * | 11/2001 | Asgeirsson ................... 700/213 |
| 6,484,939 B1 | * | 11/2002 | Blaeuer ........................ 235/383 |

FOREIGN PATENT DOCUMENTS

DE        3940605 A1  *  6/1991

* cited by examiner

Primary Examiner—Diane I. Lee
Assistant Examiner—Allyson Sanders

(57) ABSTRACT

A semi-automated shopping system includes a main cart assembly that has a frame portion. The frame portion provides both horizontal and vertical support for the main cart assembly. The frame portion has a bottom section. A plurality of wheels is operationally coupled to the bottom section. The plurality of wheels facilitates transport of the main cart assembly. The main cart assembly has a storage portion designed for receiving multiple items to be purchased. A scanner assembly is designed for recognizing universal product codes applied to a surface of an item to be purchased. The scanner assembly is operationally coupled to the main cart assembly. A processor assembly is operationally coupled to the scanner assembly. The processor assembly provides a plurality of data items associated with the universal product code.

6 Claims, 2 Drawing Sheets

SEMI-AUTOMATED SHOPPING SYSTEM

BACKGROUND OF THE INVENTION

1. Field of the Invention

The present invention relates to shopping systems and more particularly pertains to a new semi-automated shopping system for providing a user with an automated shopping system for a store that would permit cart totaling of item selections, quantities, and prices, and the subsequent transfer of the purchase information to a point of sale computer.

2. Description of the Prior Art

The use of shopping systems is known in the prior art. U.S. Pat. No. 4,071,740 describes a mobile automated shopping system used within stores as the type of utilizing shopping carts having a product code scanning means and a product weight sensing means located thereon. Another type of shopping systems is U.S. Pat. No. 5,361,871 describing a product information system for shoppers. U.S. Pat. No. 5,821,512 describes a shopping cart mounted portable data collection device with tethered dataform reader. U.S. Pat. No. 5,418,354 describes a self service cart system that speeds up throughput at a check out counter and thus reduce space devoted to check out counters. U.S. Pat. No. Des. 331,136 describes an ornamental design for a compartmented shopping cart.

SUMMARY OF THE INVENTION

The object of the present invention is to provide a new semi-automated shopping system that would minimize product handling by cashiers and employees who bag the customers purchases.

Another object of the present invention is to provide a new semi-automated shopping system that minimize delays at the checkout counters and also help build goodwill and loyalty between the customer and the retailer.

To this end, the present invention generally comprises a main cart assembly that has a frame portion. The frame portion provides both horizontal and vertical support for the main cart assembly. The frame portion has a bottom section. A plurality of wheels is operationally coupled to the bottom section. The plurality of wheels facilitates transport of the main cart assembly. The main cart assembly has a storage portion designed for receiving multiple items to be purchased. A scanner assembly is designed for recognizing universal product codes applied to a surface of an item to be purchased. The scanner assembly is operationally coupled to the main cart assembly. A processor assembly is operationally coupled to the scanner assembly. The processor assembly provides a plurality of data items associated with the universal product code.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
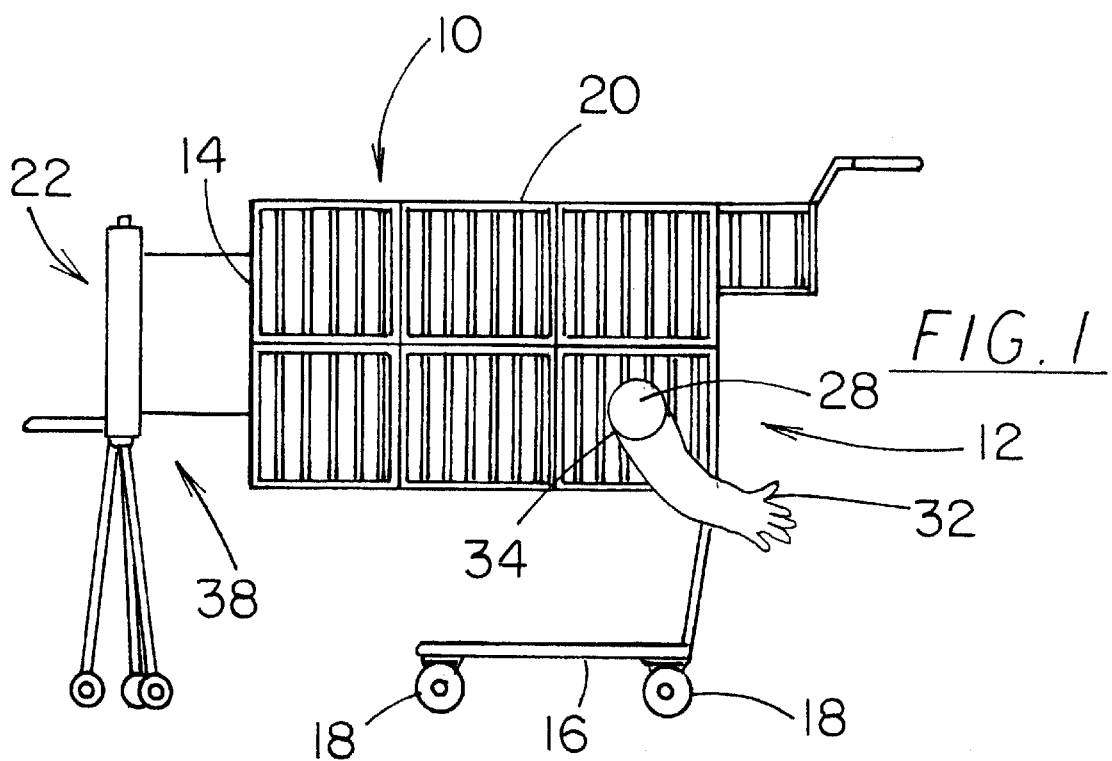
FIG. 1 is a side view of a new semi-automated shopping system according to the present invention.
Figure 2:
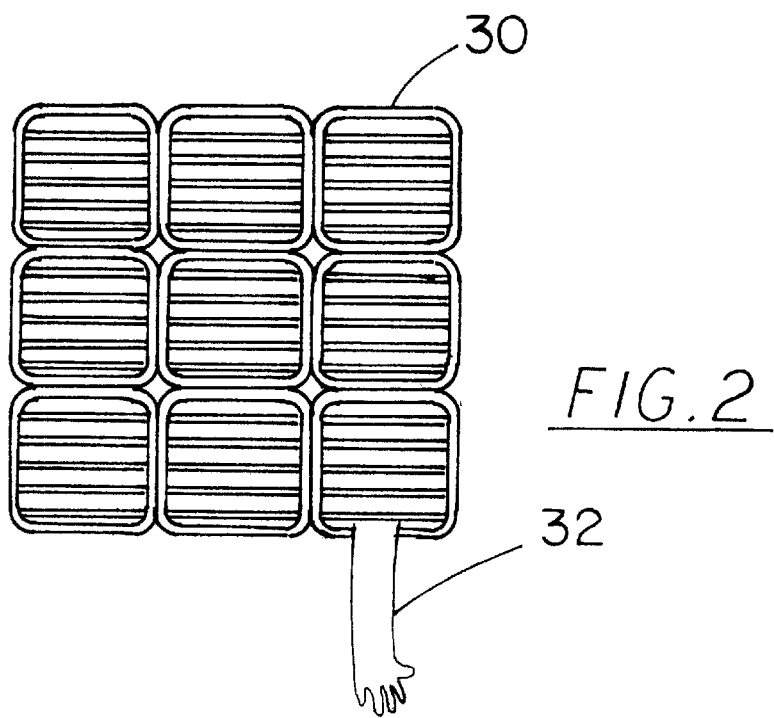
FIG. 2 is a top view of the present invention.
Figure 3:
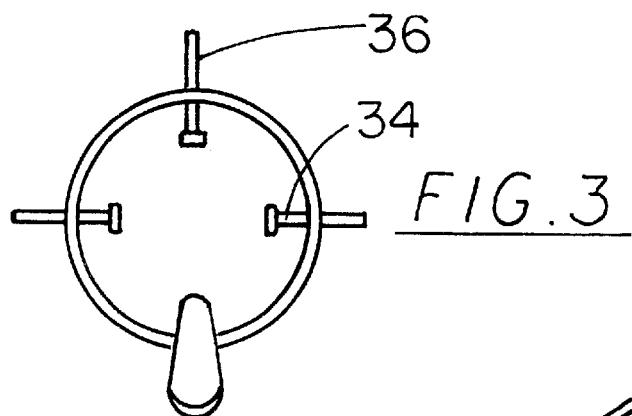
FIG. 3 is a front view of the present invention.
Figure 4:
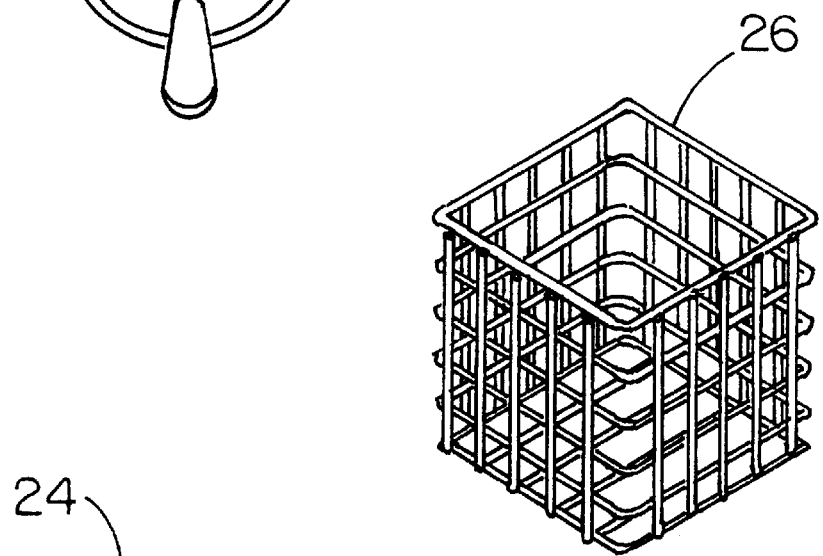
FIG. 4 is a perspective view of the present invention.
Figure 5:
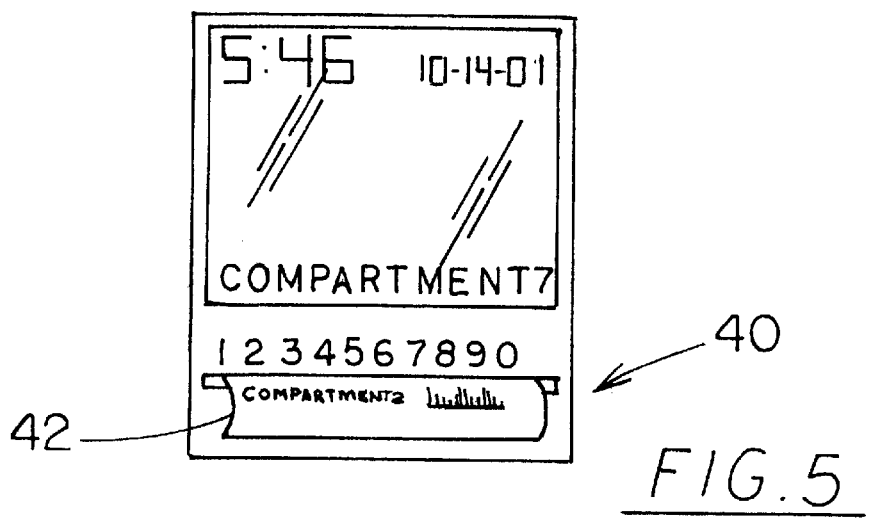
FIG. 5 is a top view of the present invention.

With reference now to the drawings, and in particular to FIGS. 1 through 5 thereof, a new semi-automated shopping system embodying the principles and concepts of the present invention and generally designated by the reference numeral 10 will be described.

As best illustrated in FIGS. 1 through 5, the semi-automated shopping system 10 generally comprises a main cart assembly 12 that has a frame portion 14. The frame portion 14 provides both horizontal and vertical support for the main cart assembly 12. The frame portion 14 has a bottom section 16. A plurality of wheels 18 is operationally coupled to the bottom section 16. The plurality of wheels 18 facilitates transport of the main cart assembly 12. The main cart assembly 12 has a storage portion 20 designed for receiving multiple items to be purchased. A scanner assembly 22 is designed for recognizing universal product codes applied to a surface of an item to be purchased. The scanner assembly 22 is operationally coupled to the main cart assembly 12. A processor assembly 24 is operationally coupled to the scanner assembly 22. The processor assembly 24 provides a plurality of data items associated with the universal product code.

The storage portion 20 further includes a plurality of container assemblies 26. Each one of the container assemblies 26 is designed for receiving a plurality of items to be purchased. The plurality of containers is positioned in an array for maximizing a storage potential of the plurality of container assemblies 26 within the storage portion 20. Each one of the plurality of container assemblies 26 is lockable to inhibit unauthorized removal of items to be purchased. Each one of the plurality of container assemblies 26 has an aperture 28 that extends through a perimeter wall 30 of the container assembly 26.

A glove member 32 is coupled to a perimeter edge 34 of the aperture 28. The glove member 32 facilitates manual placement of an item to be purchased within the container assembly. The glove member 32 inhibits removal of the item from the container assembly 26 while the container assembly is locked.

The scanner assembly 22 further includes a plurality of scanning units 36. Each one of the scanning units 36 is positioned within an associated one of the plurality of container assemblies 26 such that the universal product code of an item manually positioned within the container assembly 26 is recognizable.

The container assembly 26 further includes a lifting assembly 38 for adjusting a height of an item positioned within the container assembly 26. The lifting assembly 38 facilitates positioning the item such that the universal product code is recognizable by the scanner unit.

A purchase output system 40 is operationally coupled to the processor assembly 24. The purchase output system 40 facilitates an itemized total purchase summary for the user whereby payment can be verified. The output system 40 provides a printed output 42 for the user and a cashier. The print output 42 includes an itemized accounting of items purchased and a total amount to be paid for completing purchase.

In use, a user would scan all of the purchase products before they are loaded into the shopping cart. A tape would be printed containing all purchased bar code items and would be handed to the cashier and the check out counter for scanning, instead of handling all of the packages products for scanning. When the transaction was complete the customer's purchases could then be immediately transported and loaded directly to the customer's vehicle.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A semi-automated shopping system comprising:

a main cart assembly having a frame portion, said frame portion providing both horizontal and vertical support for said main cart assembly, said frame portion having a bottom section, a plurality of wheels being operationally coupled to said bottom section, said plurality of wheels facilitating transport of said main cart assembly, said main cart assembly having a storage portion adapted for receiving multiple items to be purchased;

a scanner assembly adapted for recognizing universal product codes applied to a surface of an item to be purchased, said scanner assembly being operationally coupled to said main cart assembly;

a processor assembly operationally coupled to said scanner assembly said processor assembly providing a plurality of data items associated with the universal product code wherein each one of said plurality of container assemblies being lockable to inhibit unauthorized removal of items to be purchased;

wherein said storage portion further comprises a plurality of container assemblies, each one of said container assemblies being adapted for receiving a plurality of items to be purchased, said plurality of containers being positioned in an array for maximizing a storage potential of said plurality of container assemblies within said storage portion;

each one of said plurality of container assemblies having an aperture extending through a perimeter wall of said container assembly;

a glove member being coupled to a perimeter edge of said aperture, said glove member facilitating manual placement of an item to be purchased within said container assembly, said glove member inhibiting removal of the item from said container assembly while said container assembly is locked.

2. The system of claim 1, wherein said scanner assembly further comprises a plurality of scanning units, each one of said scanning units positioned within an associated one of said plurality of container assemblies such that the universal product code of an item manually positioned within said container assembly is recognizable.

3. The system of claim 2, wherein said container assembly further comprises a lifting assembly for adjusting a height of an item positioned within said container assembly, said lifting assembly facilitating positioned the item such that the universal product code is recognizable by said scanner unit.

4. A semi-automated shopping system comprising:

a main cart assembly having a frame portion, said frame portion providing both horizontal and vertical support for said main cart assembly, said frame portion having a bottom section, a plurality of wheels being operationally coupled to said bottom section, said plurality of wheels facilitating transport of said main cart assembly, said main cart assembly having a storage portion adapted for receiving multiple items to be purchased;

a scanner assembly adapted for recognizing universal product codes applied to a surface of an item to be purchased, said scanner assembly being operationally coupled to said main cart assembly; and a processor assembly operationally coupled to said scanner assembly said processor assembly providing a plurality of data items associated with the universal product code;

wherein said storage portion further comprises a plurality of container assemblies, each one of said container assemblies being adapted for receiving a plurality of items to be purchased, said plurality of containers being positioned in an array for maximizing a storage potential of said plurality of container assemblies within said storage portion;

wherein each one of said plurality of container assemblies being lockable to inhibit unauthorized removal of items to be purchased;

each one of said plurality of container assemblies having an aperture extending through a perimeter wall of said container assembly, a glove member being coupled to a perimeter edge of said aperture, said glove member facilitating manual placement of an item to be purchased within said container assembly, said glove member inhibiting removal of the item from said container assembly while said container assembly is locked;

wherein said scanner assembly further comprises a plurality of scanning units, each one of said scanning units positioned within an associated one of said plurality of container assemblies such that the universal product code of an item manually positioned within said container assembly is recognizable; and wherein said container assembly further comprises a lifting assembly for adjusting a height of an item positioned within said container assembly, said lifting assembly facilitating positioned the item such that the universal product code is recognizable by said scanner unit.

5. The system of claim 4, further comprising a purchase output system operationally coupled to said processor assembly, said purchase output system facilitating an itemized total purchase summary for the user whereby payment can be verified.

6. The system of claim 5, wherein said output system providing a print output for the user and a cashier, said print output including an itemized accounting of items purchased and a total amount to be paid for completing purchase.

* * * * *